(12) United States Patent
Deak

(10) Patent No.: US 11,022,468 B2
(45) Date of Patent: Jun. 1, 2021

(54) MAGNETORESISTIVE ANGLE SENSOR AND CORRESPONDING STRONG MAGNETIC FIELD ERROR CORRECTION AND CALIBRATION METHODS

(71) Applicant: MultiDimension Technology Co., Ltd., Zhangjiagang (CN)

(72) Inventor: James Geza Deak, Zhangjiagang (CN)

(73) Assignee: MultiDimension Technology Co., Ltd., Zhangjiagang (CN)

(*) Notice: Subject to any disclaimer, the term of this patent is extended or adjusted under 35 U.S.C. 154(b) by 599 days.

(21) Appl. No.: 15/545,125

(22) PCT Filed: Jan. 13, 2016

(86) PCT No.: PCT/CN2016/070743
§ 371 (c)(1),
(2) Date: Jul. 20, 2017

(87) PCT Pub. No.: WO2016/115995
PCT Pub. Date: Jul. 28, 2016

(65) Prior Publication Data
US 2018/0017418 A1    Jan. 18, 2018

(30) Foreign Application Priority Data
Jan. 20, 2015  (CN) .................... 201510027890.X

(51) Int. Cl.
*G01D 18/00*    (2006.01)
*G01B 7/30*    (2006.01)
(Continued)

(52) U.S. Cl.
CPC .............. *G01D 18/00* (2013.01); *G01B 7/30* (2013.01); *G01D 5/16* (2013.01); *G01D 5/165* (2013.01); *G01D 18/004* (2013.01)

(58) Field of Classification Search
CPC ........ G01B 7/30; G01D 18/00; G01D 18/004; G01D 5/16; G01D 5/165
See application file for complete search history.

(56) References Cited

U.S. PATENT DOCUMENTS 7,440,762 B2 * 10/2008 Maloney ................. G01S 19/09
455/456.1
10,670,425 B2 * 6/2020 Ruigrok ................. G01D 5/145
(Continued)

FOREIGN PATENT DOCUMENTS

CN    1789920    6/2006
CN    101644561   2/2010
(Continued)

OTHER PUBLICATIONS

English machine translation of Deak (CN104677266A) (Year: 2015).*
(Continued)

*Primary Examiner* — Roy Y Yi
*Assistant Examiner* — Geoffrey T Evans
(74) *Attorney, Agent, or Firm* — Schwegman Lundberg & Woessner, P.A.

(57) ABSTRACT

A biaxial magnetoresistive angle sensor with a corresponding calibration method for magnetic field error correction, comprising two single-axis magnetoresistive angle sensors for detecting an external magnetic field in an X-axis direction and a Y-axis direction that are perpendicular to each other, a unit for calculating a vector magnitude of the voltage outputs of the single-axis magnetoresistive angle sensors along the X axis and the Y axis in real time, a unit for calculating a difference between a known calibration vector magnitude and the measured vector magnitude, a unit for dividing the difference by the square root of 2 in order to calculate an error signal, a unit for adding the error signal to the X-axis output and the Y-axis output respectively or subtracting the error signal from the X-axis output and the
(Continued)

Y-axis output in order to calculate the calibrated output signals of the X-axis and the Y-axis angle sensors, a unit for calculating an arc tangent of a factor obtained by dividing the calibrated Y-axis output signal by the calibrated X-axis output signal to provide a rotation angle of the external magnetic field. This method for applying the magnetic field error calibration to the biaxial magnetoresistive angle sensor reduces the measurement error and expands the magnetic field application range in addition to improving the measurement precision in a high magnetic field.

16 Claims, 16 Drawing Sheets

(51) Int. Cl.
    *G01D 5/16*      (2006.01)
    *G01D 5/165*      (2006.01)

(56) References Cited

U.S. PATENT DOCUMENTS

| | | | |
|---|---|---|---|
| 10,816,363 B2 * | 10/2020 | Ruigrok | G01D 5/24476 |
| 2010/0007340 A1 | 1/2010 | Kaita et al. | |
| 2010/0050731 A1 | 3/2010 | Granig et al. | |
| 2013/0339418 A1 | 12/2013 | Nikitin | |
| 2014/0253106 A1 | 9/2014 | Granig et al. | |

FOREIGN PATENT DOCUMENTS

| | | |
|---|---|---|
| CN | 102072698 | 5/2011 |
| CN | 104677266 | 6/2015 |
| EP | 1544579 | 6/2005 |
| JP | 2007304000 | 11/2007 |
| JP | 2009277315 | 11/2009 |
| JP | 2010044046 A | 2/2010 |
| WO | WO-9509562 A1 | 4/1995 |
| WO | WO-2016115995 | 7/2016 |

OTHER PUBLICATIONS

"International Application No. PCT/CN2016/070743, International Search Report and Written Opinion dated Mar. 24, 2016", (dated Mar. 24, 2016), 12 pgs.
"Chinese Application No. 201510027890.X, First Office Action dated Dec. 5, 2016", (dated Dec. 5, 2016), 9 pgs.
"European Application No. 16739742.1, Extended European Search Report dated Jul. 26, 2018", (dated Jul. 26, 2018), 7 pgs.
"Japanese Application No. 2017-538435, Notice of Reasons for Refusal dated Dec. 4, 2019", (dated Dec. 4, 2019), 6 pgs.
"European Application No. 16739742.1, Response filed Jun. 12, 2019 to Extended European Search Report", (dated Jun. 12, 2019), 45 pgs.

* cited by examiner

External magbetic field (Oe)

Field angle (degrees)

External magnetic field applied at 33° (Oe)

External field application angle (°)

External field application angle (°)

MAGNETORESISTIVE ANGLE SENSOR AND CORRESPONDING STRONG MAGNETIC FIELD ERROR CORRECTION AND CALIBRATION METHODS

PRIORITY CLAIM TO RELATED APPLICATIONS

This application is a U.S. national stage application filed under 35 U.S.C. § 371 from International Application Serial No. PCT/CN2016/070743, which was filed 13 Jan. 2016, and published as WO2016/115995 on 28 Jul. 2016, and which claims priority to Chinese Application No. 201510027890.X, filed 20 Jan. 2015, which applications and publication are incorporated by reference as if reproduced herein and made a part hereof in their entirety, and the benefit of priority of each of which is claimed herein.

TECHNICAL FIELD

The present invention relates to calibration of output errors of a biaxial magnetoresistive angle sensor used in a strong magnetic field.

BACKGROUND ART

A combination of a magnetoresistive sensor and a magnet rotating along an axis provides an attractive means for non-contact measurement of rotation along an axis of various automotive, industrial, and consumer products. In the prior art, there are many different types of magnetic angle sensors for measuring the orientation of magnetic fields. Unfortunately, they all have problems well-known in the art, for example, large size, insufficient sensitivity, insufficient dynamic range, high cost, low reliability, and other problems. Therefore, magnetoresistive angle sensor designs require further improvement in order to achieve a magnetoresistive angle sensor with high performance, especially a magnetoresistive angle sensor that can be easily combined and used with an integrated circuit using existing manufacturing methods.

When an external magnetic field is applied, it is known in the art that the finite value of the pinning layer of a GMR or TMR magnetoresistive angle sensor increases output error. This is because the applied external magnetic field causes slight movement of the magnetization direction of the pinned layer. The present invention provides a correction algorithm to solve this problem. When this algorithm is applied to a biaxial TMR/GMR angle sensor, the measurement error related to the intensity of the external magnetic field is greatly reduced. The new algorithm includes simple mathematics and simple one-time calibration, and it expands the magnetic field application range of the biaxial TMR/GMR magnetoresistive angle sensor in addition to greatly improving the measurement precision in a high magnetic field.

SUMMARY OF THE INVENTION

To solve the above problems, the present invention provides a biaxial magnetoresistive angle sensor, including two orthogonal single-axis magnetoresistive angle sensors for detecting an external magnetic field in an X-axis direction and a Y-axis direction that are perpendicular to each other, a unit for calculating in real time a measured vector magnitude of the voltage outputs of the single-axis magnetoresistive angle sensor along the X-axis and the Y-axis, a unit for calculating a difference between a known calibration vector magnitude and the measured vector magnitude, a unit for dividing the difference by the square root of 2 in order to calculate an error signal, a unit for adding the error signal to the X-axis output and the Y-axis output respectively or subtracting the error signal from the X-axis output and the Y-axis output in order to calculate the calibrated output signals of the X-axis and the Y-axis angle sensors, and a unit for calculating an arc tangent of a factor obtained by dividing the calibrated Y-axis output signal by the calibrated X-axis output signal to provide the rotation angle of the external magnetic field.

The X-axis output and the Y-axis output are respectively an offset-calibrated X-axis voltage output and an offset-calibrated Y-axis voltage output, a first offset calibration value is subtracted from the X-axis voltage output to obtain the offset-calibrated X-axis voltage output; and a second offset calibration value is subtracted from the Y-axis voltage output to obtain the offset-calibrated Y-axis voltage output.

The X-axis voltage output is divided by a first known vector magnitude calibration value, the Y-axis voltage output is divided by a second known vector magnitude calibration value, and the first known vector magnitude calibration value and the second known vector magnitude calibration value are set to 1.

The offset-calibrated X-axis voltage output is divided by the first known vector magnitude calibration value, the offset-calibrated Y-axis voltage output is divided by the second known vector magnitude calibration value, and the first known vector magnitude calibration value and the second known vector magnitude calibration value are set to 1.

Each of the single-axis magnetoresistive angle sensors is a GMR spin valve or a TMR sensor.

The biaxial magnetoresistive angle sensor further includes a temperature sensor.

A temperature signal generated by the temperature sensor is used for calculating a linearly varying peak value, offset calibration value, and/or vector magnitude calibration value with respect to temperature.

The voltage outputs of the X-axis single-axis magnetoresistive sensor and the Y-axis single-axis magnetoresistive sensor that are orthogonal to each other have approximately identical maximum amplitudes.

The known calibration vector magnitude is $$V_p = \{Max[Vx(\theta,H)] - Min[Vx(\theta,H)] + Max[Vy(\theta,H)] - Min[Vy(\theta,H)]\}/4.$$

The first offset calibration value is $Vox = \{Max[V_{cos}(\theta,H)] + Min[V_{cos}(\theta,H)]\}/2$, the second offset calibration value is $Voy = \{Max[V_{sin}(\theta,H)] + Min[V_{sin}(\theta,H)]\}/2$.

The biaxial magnetoresistive angle sensor further includes a unit for storing the offset value and a calibration constant of the maximum amplitude, the calibration constant of the maximum amplitude is calculated by using the maximum peak value and the minimum peak value obtained when each single-axis magnetoresistive angle sensor rotates by 360 degrees in the external magnetic field, and the biaxial magnetoresistive angle sensor only needs to store the peak value and the offset value for calibration of each of the single-axis magnetoresistive sensor.

Correspondingly, the present invention further provides a calibration method for magnetic field error correction of a magnetoresistive angle sensor, including:

detecting an external magnetic field in an X-axis direction and a Y-axis direction that are perpendicular to each other by using two orthogonal single-axis magnetoresistive angle sensors;

calculating a measured vector magnitude of the voltage outputs of the magnetoresistive angle sensor along the X-axis and the Y-axis in real time;

calculating a difference between a known calibration vector magnitude and the measured vector magnitude;

dividing the difference by the square root of 2 in order to calculate an error signal;

adding the error signal to the X-axis output and the Y-axis output respectively or subtracting the error signal from the X-axis output and the Y-axis output in order to calculate the calibrated output signals of the X-axis and the Y-axis angle sensors; and calculating an arc tangent of a factor obtained by dividing the calibrated Y-axis output signal by the calibrated X-axis output signal to provide a rotation angle of the external magnetic field.

The X-axis output and the Y-axis output are respectively an offset-calibrated X-axis voltage output and an offset-calibrated Y-axis voltage output, a first offset calibration value is subtracted from the X-axis voltage output to obtain the offset-calibrated X-axis voltage output; and a second offset calibration value is subtracted from the Y-axis voltage output to obtain the offset-calibrated Y-axis voltage output.

The X-axis voltage output is divided by a first known vector magnitude calibration value, the Y-axis voltage output is divided by a second known vector magnitude calibration value, and the first known vector magnitude calibration value and the second known vector magnitude calibration value are set to 1.

The offset-calibrated X-axis voltage output is divided by the first known vector magnitude calibration value, the offset-calibrated Y-axis voltage output is divided by the second known vector magnitude calibration value, and the first known vector magnitude calibration value and the second known vector magnitude calibration value are set to 1.

The peak value, the offset calibration value and/or vector magnitude calibration value vary linearly with respect to temperature.

The voltage outputs of the X-axis single-axis magnetoresistive sensor and the Y-axis single-axis magnetoresistive sensor that are orthogonal to each other have approximately identical maximum amplitudes.

The known calibration vector magnitude is $$V_p = \{\text{Max}[Vx(\theta,H)] - \text{Min}[Vx(\theta,H)] + \text{Max}[Vy(\theta,H)] \text{Min}[Vy(\theta,H)]\}/4.$$

The first offset calibration value is $Vox = \{\text{Max}[V_{cos}(\theta,H)] + \text{Min}[V_{cos}(\theta,H)]\}/2$, the second offset calibration value is $Voy = \{\text{Max}[V_{sin}(\theta,H)] + \text{Min}[V_{sin}(\theta,H)]\}/2$.

The offset value and a calibration constant of the maximum amplitude are stored, the calibration constant of the maximum amplitude is calculated by using the maximum peak value and the minimum peak value obtained when each single-axis magnetoresistive angle sensor rotates by 360 degrees in the external magnetic field, and the magnetoresistive angle sensor only needs to store the peak value and the offset value for calibration of each of the single-axis magnetoresistive sensor.

Because of the above technical solutions, the present invention has the following beneficial effects: the present invention applies the correction algorithm to the biaxial magnetoresistive angle sensor, which greatly reduces the measurement error related to the intensity of the external magnetic field, expands the magnetic field application range of the biaxial magnetoresistive angle sensor, and greatly improves the measurement precision thereof in a strong magnetic field.

DETAILED DESCRIPTION

Figure 1:
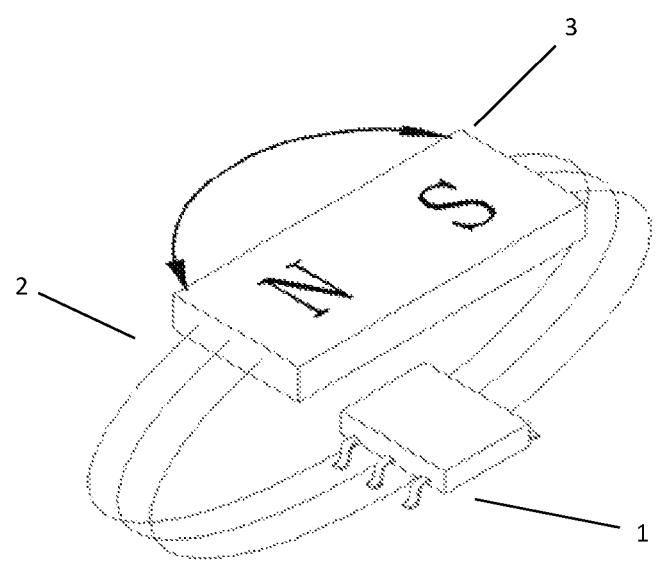
FIG. 1 is a working principle of a magnetoresistive angle sensor.

FIG. 1 is a schematic diagram of the working principle of a biaxial magnetoresistive angle sensor 1. The biaxial magnetoresistive angle sensor 1 includes two single-axis magnetoresistive angle sensors that are rotated by 90° with respect to each other, in order to measure the intensity of a magnetic field along an X-axis and a Y-axis. One of the single-axis magnetoresistive angle sensors for measuring a cosine waveform is referred to as a cosine sensor, and the other one for measuring a sine waveform is referred to as a sine sensor. The magnetoresistive (MR) angle sensor 1 is placed in a rotating magnetic field 2 generated by a magnet 3. By detecting resistance changes of the biaxial magnetoresistive angle sensor 1, the biaxial magnetoresistive angle sensor 1 can measure a rotation angle of the magnet 3. The resistance changes of the biaxial magnetoresistive angle sensor 1 vary according to a sine-cosine wave rule.

Figure 2A:
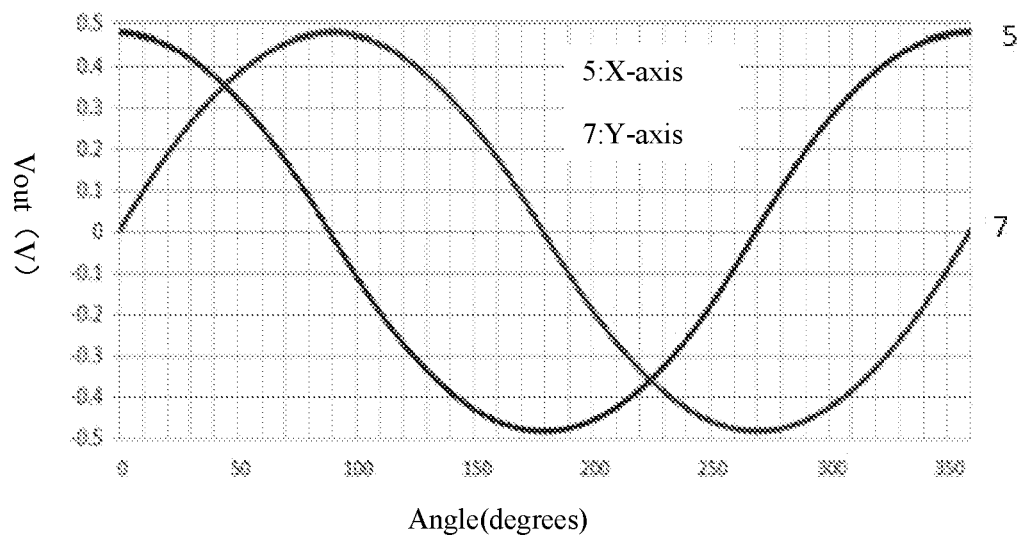
FIG. 2A is an ideal voltage output curve of a biaxial magnetoresistive angle sensor 1.
Figure 2B:
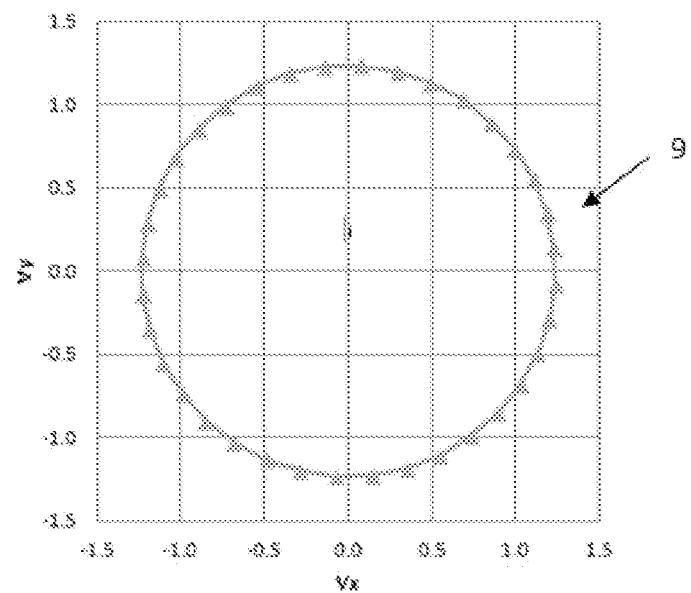
FIG. 2B is an ideal XY-curve graph of the biaxial magnetoresistive angle sensor 1 obtained by plotting of an X-axis output vs. a Y-axis output.

FIG. 2A is a sine-cosine output curve of the biaxial magnetoresistive angle sensor 1. Ideal sine and cosine output curves are obtained by plotting of the output of the biaxial magnetoresistive angle sensor 1 vs. the rotation angle of the rotating magnetic field 2: a cosine waveform is along the X-axis, and a sine waveform is along the Y-axis; and the two waveforms are respectively an ideal Y-axis sine waveform 7 and an ideal X-axis cosine waveform 5. A curve obtained by plotting of an ideal X-axis voltage output vs. the Y-axis voltage output is a perfect circle 9 as shown in FIG. 2B. Specifically, this means that a vector magnitude of the output voltage component is independent of the rotating angle. As discussed in the following, such a characteristic is a key part enabling the correction algorithm proposed in the present invention to work. In any situation, the rotation angle may be calculated by using a well-known CORDIC algorithm, wherein the voltage of the sine sensor is divided by the voltage of the cosine sensor, and then an arc tangent of the ratio is calculated to determine the rotation angle of the magnet 3.

Figure 3A:
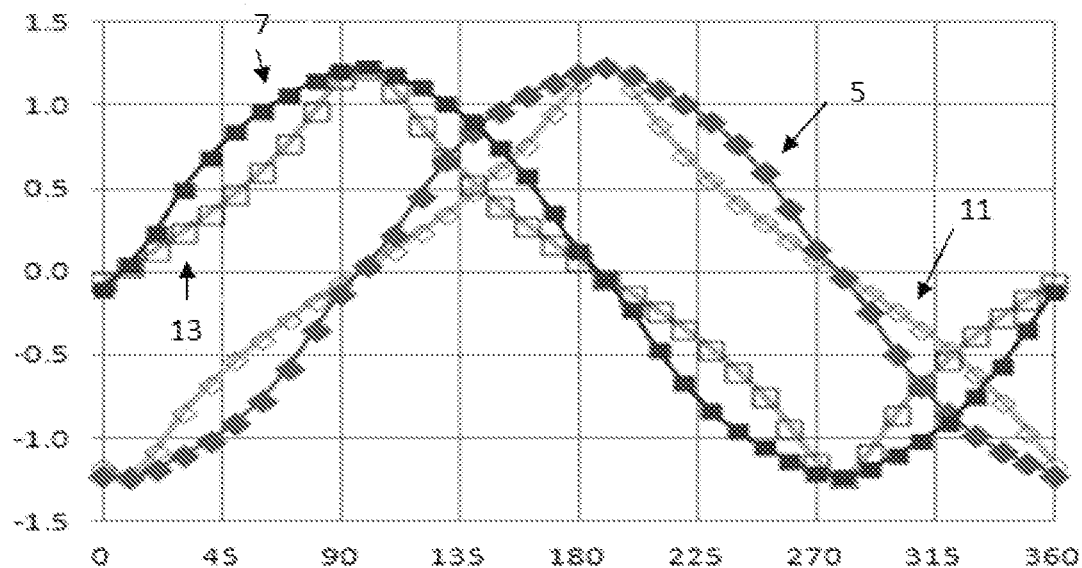
FIG. 3A is a non-ideal voltage output curve of the biaxial magnetoresistive angle sensor 1.
Figure 3B:
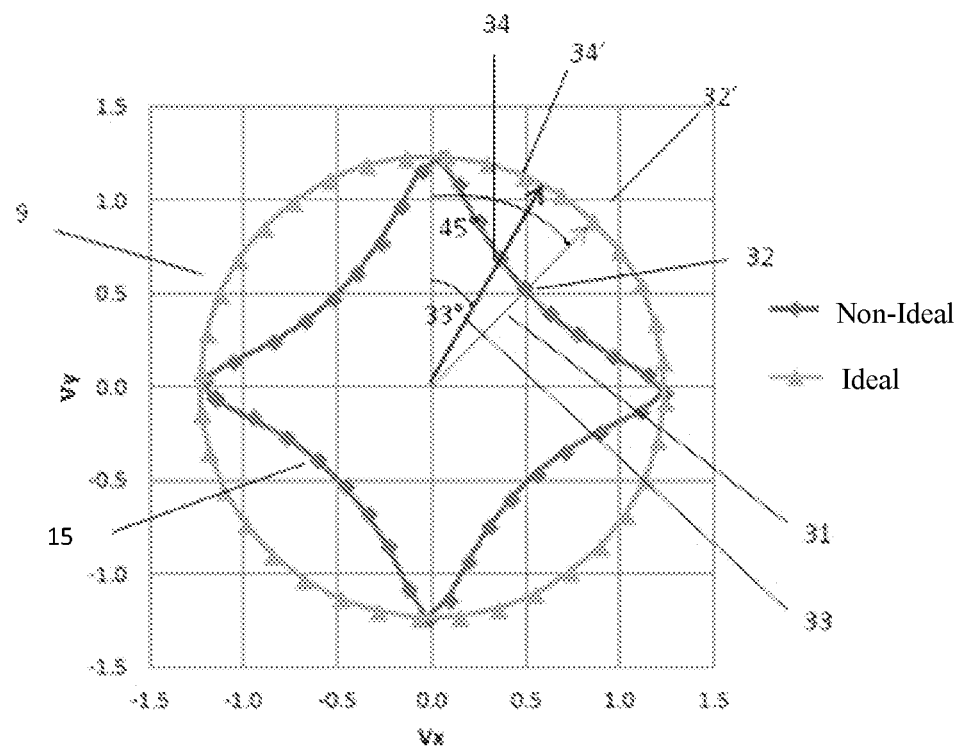
FIG. 3B is a non-ideal XY-curve graph of the biaxial magnetoresistive angle sensor 1 obtained by plotting of the X-axis output vs. the Y-axis output.

FIG. 3A and FIG. 3B are non-ideal output curves of a TMR (tunneling magnetoresistance) or GMR (giant magnetoresistance) biaxial magnetoresistive sensor 1 when a strong magnetic field is applied externally. FIG. 3A shows that a Y-axis wave curve 13 and an X-axis wave curve 11 of the biaxial magnetoresistive angle sensor 1 are strongly distorted. FIG. 3B shows an ideal XY-output curve 9 formed by ideal outputs and a non-ideal XY-output curve 15 formed by non-ideal outputs. In this figure, it is obvious that the non-idea XY-output curve 15 is not circular, and tends to form a shape of an asteroid or a square in an XY plane. The vector magnitude of the biaxial sensor 1 is not independent of the rotation angle. An error may be caused when an angle of the rotating magnetic field 2 is calculated by using CORDIC by the above-mentioned distortion shown by a 33-degree vector 33 and a 45-degree vector 31. A point 32 on the distorted curve 15 should be a point 32' on the curve 9 of the ideal curve. A point 34 on the distorted curve 15 is not mapped to a corresponding point on the ideal curve 9 along the vector 33, but is mapped to a point 34' having a smaller angle. This indicates that the output curve may have an error in a high field, and an angle-dependent error or a non-linear error may be generated; therefore, the output of the MR angle sensor 1 needs to be modified.

Figure 4A:
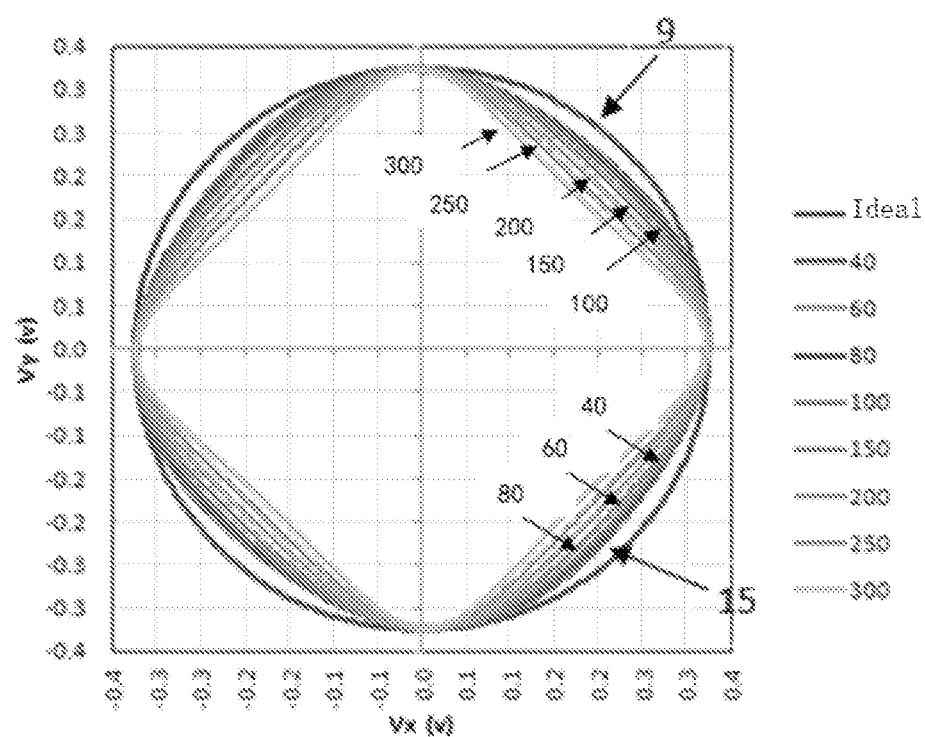
FIG. 4A is effects of different intensity of the external magnetic field on an XY-curve obtained by plotting of the X-axis output vs. the Y-axis output of the biaxial magnetoresistive angle sensor 1.
Figure 4B:
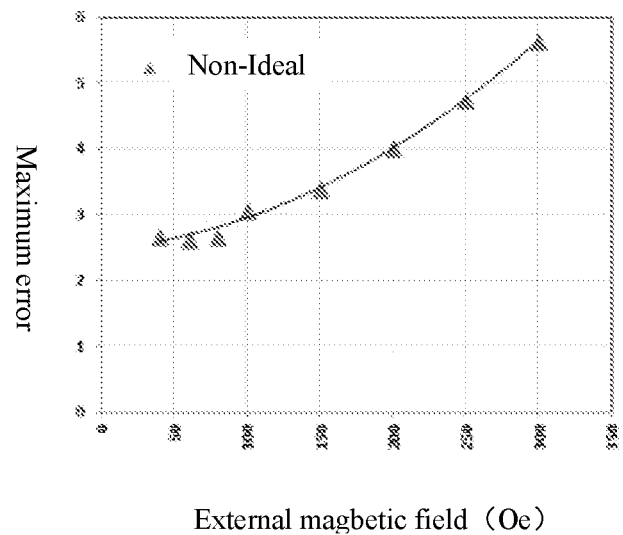
FIG. 4B is the maximum error of the output of the biaxial angle sensor 1 measured in different intensity of the external magnetic field.

There is generally an optimal value that can minimize the measurement error of the non-linear external magnetic field 2 output by the sensor; however, generally, the measurement error increases as the intensity of the applied external magnetic field 2 increases. FIG. 4 shows dependency of the measurement error on the magnetic field intensity. FIG. 4A shows XY-output curves measured in different magnetic field intensity. It should be noted that the enhanced external magnetic field may result in the increased error, and this is illustrated by a group of output curves 15 in a higher external magnetic field in FIG. 4A. External magnetic fields having different intensity are applied to the magnetoresistive angle sensor 1. FIG. 4B is a curve obtained by plotting of the maximum error generated by the output of the biaxial magnetoresistive angle sensor 1 vs. the intensity of the external rotating magnetic field 2 when the external rotating magnetic field 2 rotates by 360 degrees, which further clearly indicates that the output error increases as the magnetic field intensity increases.

Figure 5:
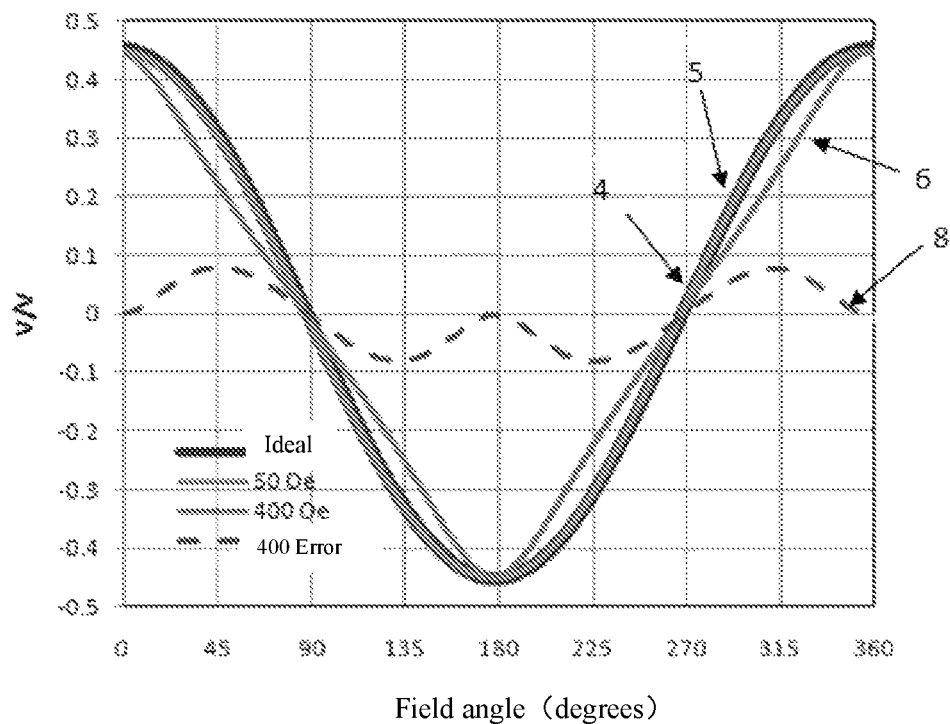
FIG. 5 is a curve graph showing a common effect observed in all GMR/TMR angle sensors.

FIG. 5 is a curve graph for illustrating the function of a GMR angle sensor. It relates to a structure of a GMR or TMR unit. When the rotating magnetic field is as low as 50 Oe, the output response curve 4 is identical to the ideal output curve 5. If the intensity of the rotating magnetic field is up to 400 Oe, an output curve 6 becomes a triangle. A difference between the distorted curve and the ideal curve or a single-axis error is curve 8.

Such an error deviating from the ideal output curve may be caused by a non-ideal behavior of an incompletely saturated layer as in the case of a free layer in a low external magnetic field. It may also be caused by limited strength of a pinning field of a pinning layer (PL) in a strong external magnetic field. The high field error mainly is caused by the non-ideal behavior of the pinning layer as will be illustrated in the following, wherein a magnetization direction of the pinned layer is slightly moved due to the applied external magnetic field, and such movement increases as the intensity value of the applied external magnetic field increases.

The present invention discloses a correction algorithm for calibrating the high field error of the sensor output caused by the pinning layer or other reasons.

Figure 6:
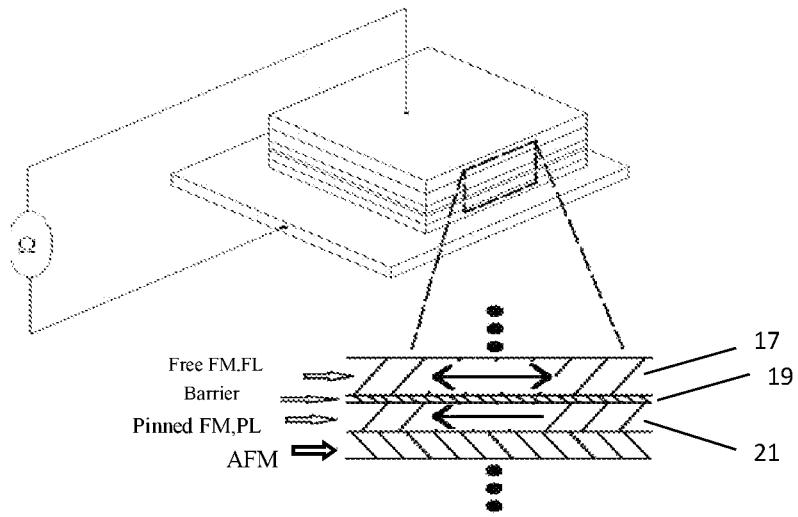
FIG. 6 is a schematic diagram of an MTJ (magnetic tunnel junction) unit.

FIG. 6 is a simple MTJ structure. The sensor units each include a ferromagnetic layer-insulation layer-ferromagnetic layer structure (FM-I-FM). Generally, there are at least two ferromagnetic metal layers separated by an insulation tunnel barrier 19. The thickness of the tunnel barrier 19 is about 2 nm, and the thickness of the layer controls the resistance of the tunnel junction. The magnetoresistive effect of such a structure is referred to as tunneling magnetoresistance (TMR), having a magnitude easily exceeding DR/R0≈200%. The resistance change of the sensing unit is in direct proportion to cosine of a relative orientation angle between magnetization directions of the free layer 17 and the pinning layer (PL) 21. Therefore, if the MTJ is such designed that the rotation of the FL17 responds to the applied external magnetic field H, and the magnetization direction of the PL21 is rigidly fixed, the output resistance of the sensor unit is related to the direction of the applied magnetic field. The resistance change of the MTJ is a function of the relative angle between the magnetization directions of the FL and PL layers; therefore, any tiny rotation of the pinning layer 21 will increase the error of the sensor.

Figure 7:
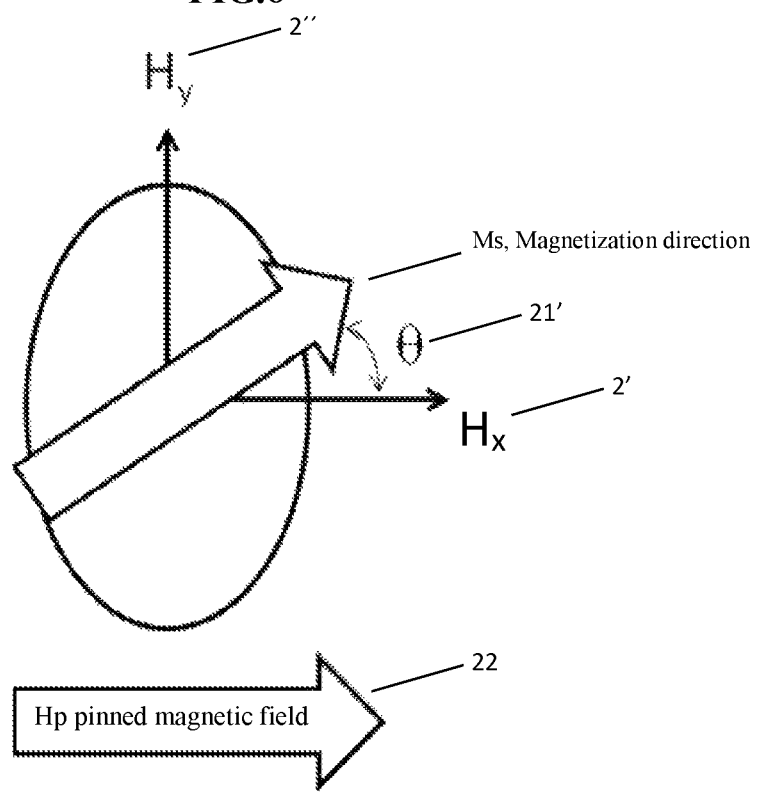
FIG. 7 is a schematic diagram explaining movement of a pinning layer generated by the applied external magnetic field.

It is assumed that the magnetization of the FL17 completely follows the angle of the applied external magnetic field, and analysis on the error may be made by merely considering a magnetization direction 21 of the PL21. FIG. 7 shows a direction 22 of a pinning magnetic field, a magnetization direction 21' of the PL21, and directions of two components X2' and Y2" of the external magnetic field 2. In order to determine the response to the external magnetic field 2 applied by the PL21, general free energy analysis as follows is made, wherein the energy of the system depends on the magnetization direction of the PL 21 relative to the total magnetic field:

$$E = -\frac{1}{2}\overline{M}_s \cdot (\overline{H}_p + \overline{H}) \tag{1}$$

$$E = -\frac{1}{2}M_s\{(H_p + H_x)\cos\theta + H_y\sin\theta\} \tag{2}$$

$$\frac{dE}{d\theta} = 0 = -\frac{1}{2}M_s\{-(H_p + H_x)\sin\theta + H_y\cos\theta\} \tag{3}$$

The rotation angle of the magnetization direction of the PL may be obtained by using an equation (3), and the rotation angle is expressed as $\theta_{err}$.

$$\theta_{err} = a\tan\left\{\frac{H_y}{H_p + H_x}\right\} \tag{4}$$

The intensity of the pinning magnetic field (Hp) in the equation (4) is generally about 1500 Oe, and this limits the precision of the MTJ magnetoresistive sensor.

Figure 8A:
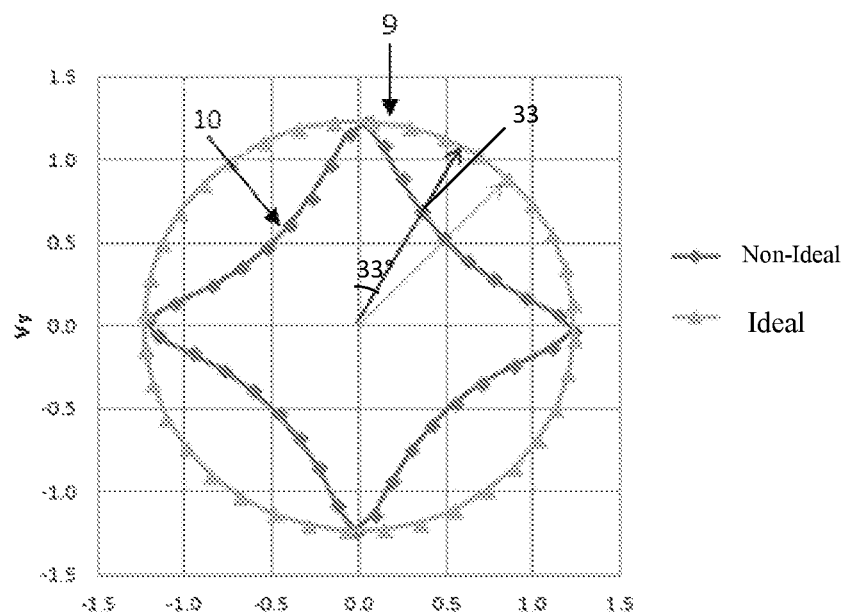
FIG. 8A is the maximum error XY-curve when an angle of the external magnetic field with respect to the pinning layer is 33°.
Figure 8B:
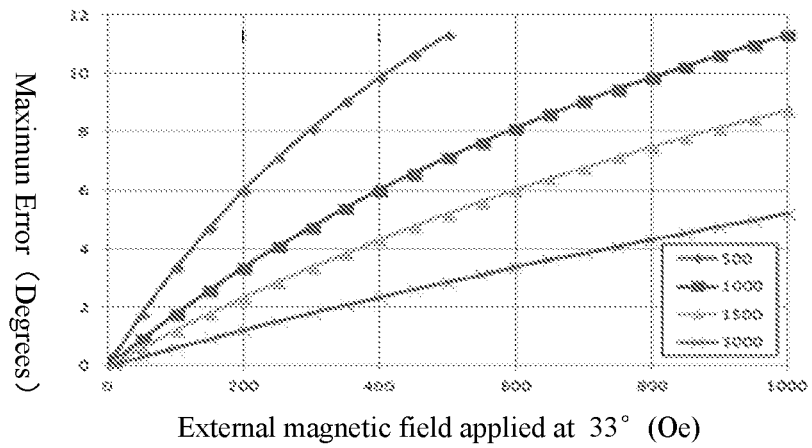
FIG. 8B is the maximum error caused by movement of the pinning layer obtained by calculation in different magnetic field intensity HPS when the angle of the external magnetic field with respect to the pinning layer is 33°.

The measured data indicates that the measurement error of the angle is the worst when the angle of the applied external magnetic field is about 30 degrees, and this may be observed by mapping a data point from the non-ideal curve 15 to the ideal curve 9, see FIG. 8A. In addition, the measurement error is a minimum when the angle of the external magnetic field is 45 degrees. FIG. 8B is a plot of the calculated maximum PL angle error vs. Hp. It is assumed that the maximum measurement error occurs when the angle of applying the external magnetic field is 33°, and is calculated by using a formula (5). The error curve obtained by calculation with the formula 5 is very consistent with the error curve measured on a real device.

$$\theta_{err} = a\tan\left\{\frac{H/3}{(H_p + 2H/3)}\right\} \tag{5}$$

Figure 9:
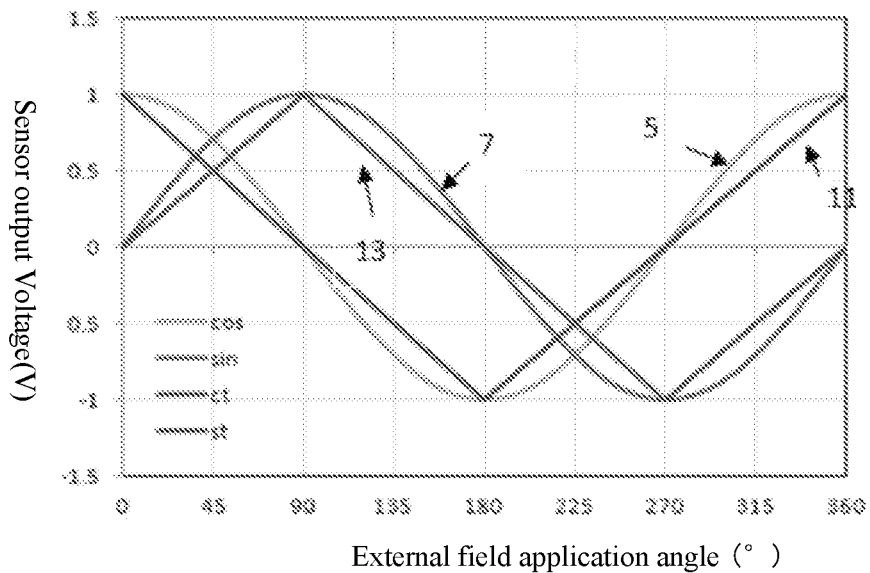
FIG. 9 indicates that the magnitude of the non-ideal output waveform is equal to or less than the magnitude of the ideal output waveform.

FIG. 9 is a plot of the voltage output wave of the biaxial magnetoresistive angle sensor 1 vs. the angle of the applied external magnetic field. In the figure, zero degree indicates an applied magnetic field parallel to the Hp direction. As for an output model of the biaxial magnetoresistive angle sensor 1, Cos=ideal cosine axis voltage, Sin=ideal sine axis voltage, CT=triangular non-ideal cosine signal, and ST=triangular non-ideal sine signal.

It should be noted that the magnitudes of the non-ideal curves 11 and 13 are always equal to or less than the magnitudes of the ideal curves 5 and 7, and the magnitudes of the measurement errors are in a 90-degree phase. The non-ideal curves 11 and 13 and the ideal curves 5 and 7 have identical maximum and minimum peak values. The above model is universal in measurement, indicating that a correction algorithm may be established accordingly.

Figure 10:
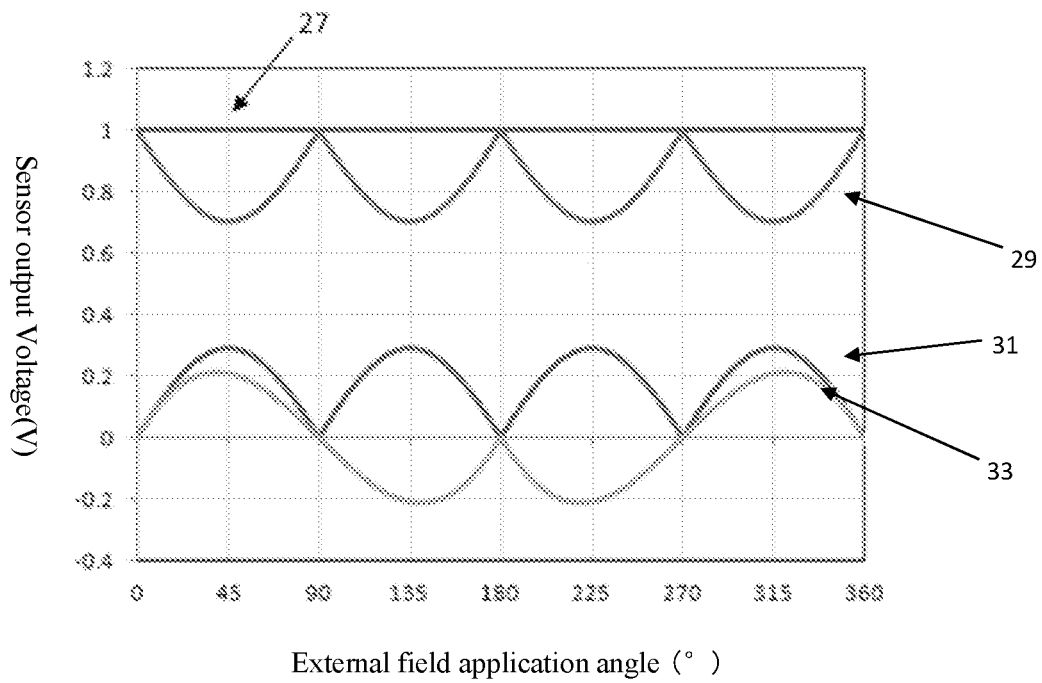
FIG. 10 shows comparison between a biaxial magnitude and a single-axis error.

To explain this correction method, FIG. 10 is a drawn error signal curve. An ideal magnitude 27=biaxial vector magnitude; an original magnitude 29=vector magnitude of the biaxial triangular wave; a magnitude difference 31=ideal magnitude−original magnitude; and a triangular wave error 33=a single-axis difference between the ideal sine-cosine wave curve and the triangular wave error.

Figure 11:
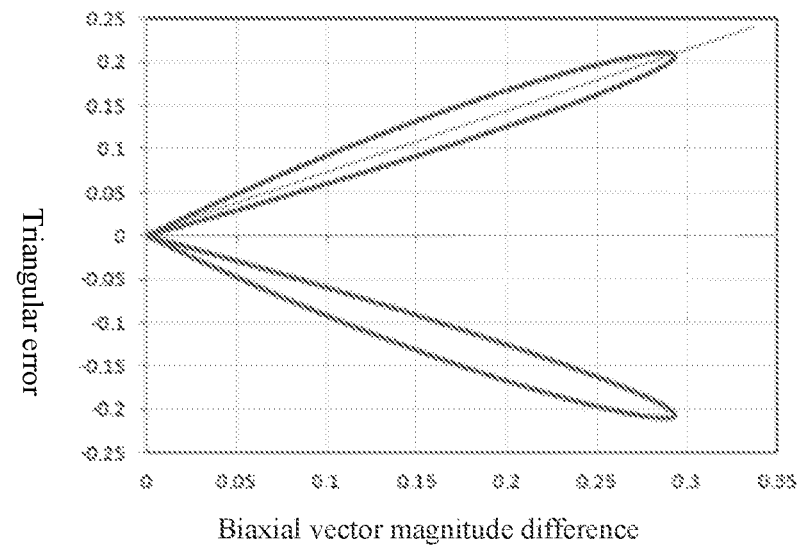
FIG. 11 is a plot of a single-axis output error as a function of a biaxial magnitude error, indicating that the single-axis error is proportional to the biaxial magnitude error.

It should be noted that the magnitude difference can be easily calculated in real time. The triangular error 33 is unknown in actual measurement, but it is related to the magnitude difference; this is displayed in FIG. 11. In FIG. 10, a difference of Cos−CT (curve 7−curve 13) is expressed as a plot of the curve 31 vs. vector magnitude (vector magnitudes of the curves 11 and 13) curve 29 of the CT and ST. Surprisingly, FIG. 11 indicates that a difference between the magnitude of the non-ideal curve (the measured vector magnitude) and an expected peak value (amplitude) of each axis is proportional to the angle measurement error (triangular error). This proportion, that is, a slope, is:

$$1.39 \approx 1.41 = \sqrt{2} \tag{6}$$

Figure 12:
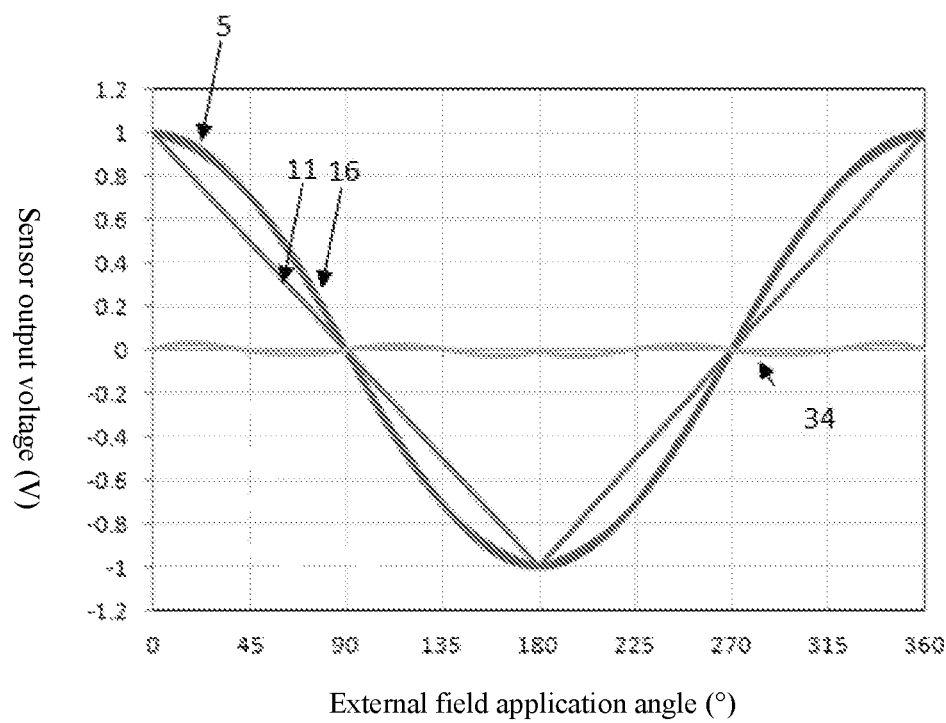
FIG. 12 is a curve graph indicating that the non-ideal output of the angle sensor may be corrected by adding the measured biaxial magnitude error back to the non-ideal distorted waveform.

It can be seen that, a difference calculated by the vector magnitudes between non-ideal and ideal responses may be added back to the output of the sensor 1 in real time to calibrate an orthogonal single-axis waveform. The result is that, a triangular error 34 in FIG. 12 becomes much less than that in FIG. 10, and a calibrated X-axis voltage output curve 16 is obtained after the non-ideal cosine wave curve 11 is calibrated, which is identical to the ideal X-axis voltage output curve 5.

The non-ideal sine waveform 13 is expressed as $V_{SIN}(\theta, H)$; the non-ideal cosine wave 11 is expressed as $V\cos(\theta,H)$; offsets of the sine and cosine waveforms are respectively expressed as $V_{os}$ and $V_{oc}$; peak values of the sine and cosine waveforms are expressed as $V_{ps}$ and $V_{pc}$; V' $\sin(\theta,H)$ and V' $\cos(\theta,H)$ are used as sensor outputs having corrected offsets and magnitudes; and then the following equation can be used for correcting the non-ideal output waveform in real time:

$$V'_s(\theta, H) = \{V_{sin}(\theta, H) - V_{os}\}/V_{ps} \tag{7}$$

$$V'_c(\theta, H) = \{V_{cos}(\theta, H) - V_{oc}\}/V_{pc} \tag{8}$$

$$\text{Error}(\theta, H) = \left\{1 - \sqrt{\left(\frac{V'_c(\theta,H)}{V_{pc}}\right)^2 + \left(\frac{V'_s(\theta,H)}{V_{ps}}\right)^2}\right\}/\sqrt{2} \tag{9}$$

$$V_{sin}(\theta, H)_{corr} = \begin{cases} V'_s(\theta, H) \geq 0: & V'_s(\theta, H) + \text{Error}(\theta, H) \\ V'_s(\theta, H) < 0: & V'_s(\theta, H) - \text{Error}(\theta, H) \end{cases} \tag{10}$$

$$V_{cos}(\theta, H)_{corr} = \begin{cases} V'_c(\theta, H) \geq 0: & V'_c(\theta, H) + \text{Error}(\theta, H) \\ V'_c(\theta, H) < 0: & V'_c(\theta, H) - \text{Error}(\theta, H) \end{cases} \tag{11}$$

By calculation through formulas 12 to 15, $V_{peak}$ ($V_{peak}$ is the sensor or amplitude of the maximum or minimum signal) and $V_{offset}$ (offset of the sensor signal) may be obtained:

$$V_{pc} = \{\text{Max}[V_{cos}(\theta,100)] - \text{Min}[V_{cos}(\theta,100)]\}/2 \tag{12}$$

$$V_{ps} = \{\text{Max}[V_{sin}(\theta,100)] - \text{Min}[V_{sin}(\theta,100)]\}/2 \tag{13}$$

$$V_{oc} = \{\text{Max}[V_{cos}(\theta,100)] + \text{Min}[V_{cos}(\theta,100)]\}/2 \tag{14}$$

$$V_{os} = \{\text{Max}[V_{sin}(\theta,100)] + \text{Min}[V_{sin}(\theta,100)]\}/2 \tag{15}$$

Generally, it only needs to calculate the four parameters ($V_{pc}$, $V_{ps}$, $V_{oc}$, and $V_{os}$). In an actual operation, if the sine and cosine waveforms match with each other, only $V_p$ is enough. This method is advantageous in that no waveform needs to be stored, and it only needs to store at most four parameters. The magnet 3 only needs to rotate by 360 degrees. H may be any value as long as the magnetoresistive angle sensor 1 is saturated.

Suppose that the sensor is saturated, as indicated by experience, the sensor only needs to be calibrated in a single magnetic field. Suppose that the sensor is saturated at 100 G, and the sine and cosine curves are well matched, then the following embodiment illustrates how the sensor 1 is calibrated:

$$V_p = \{\text{Max}[V_c(\theta,100)] - \text{Min}[V_c(\theta,100)] + \text{Max}[V_s(\theta,100)] - \text{Min}[V_s(\theta,100)]\}/4 \quad (16)$$

The following equations are added to each measurement value for correcting the error:

$$V_s'(\theta, H) = V_{sin}(\theta, H) \quad (17)$$

$$V_c'(\theta, H) = V_{cos}(\theta, H) \quad (18)$$

$$\text{Error}(\theta, H) = \left\{V_p - \sqrt{V_c'(\theta,H)^2 + V_s'(\theta,H)^2}\right\}/\sqrt{2} \quad (19)$$

$$V_{sin}(\theta, H)_{corr} = \begin{cases} V_s'(\theta, H) \geq 0: & V_s'(\theta, H) + \text{Error}(\theta, H) \\ V_s'(\theta, H) < 0: & V_s'(\theta, H) - \text{Error}(\theta, H) \end{cases} \quad (20)$$

$$V_{cos}(\theta, H)_{corr} = \begin{cases} V_c'(\theta, H) \geq 0: & V_c'(\theta, H) + \text{Error}(\theta, H) \\ V_c'(\theta, H) < 0: & V_c'(\theta, H) - \text{Error}(\theta, H) \end{cases} \quad (21)$$

In another embodiment, the offset value is small, and the sine and cosine waves have identical peak values; then, the calibration may be conducted through the following equations:

$$VMag(\theta, H) = \sqrt{V_x^2(\theta, H) - V_y^2(\theta, H)} \quad (22)$$

$$\text{Error}(\theta, H) = \left\{V_p - \sqrt{Vx(\theta,H)^2 + Vy(\theta,H)^2}\right\}/\sqrt{2} \quad (23)$$

$$V_{sin}(\theta, H)_{corr} = \begin{cases} Vy(\theta, H) \geq 0: & Vy(\theta, H) + \text{Error}(\theta, H) \\ Vy(\theta, H) < 0: & Vy(\theta, H) - \text{Error}(\theta, H) \end{cases} \quad (24)$$

$$V_{cos}(\theta, H)_{corr} = \begin{cases} Vx(\theta, H) \geq 0: & Vx(\theta, H) + \text{Error}(\theta, H) \\ Vx(\theta, H) < 0: & Vx(\theta, H) - \text{Error}(\theta, H) \end{cases} \quad (25)$$

Figure 13A:
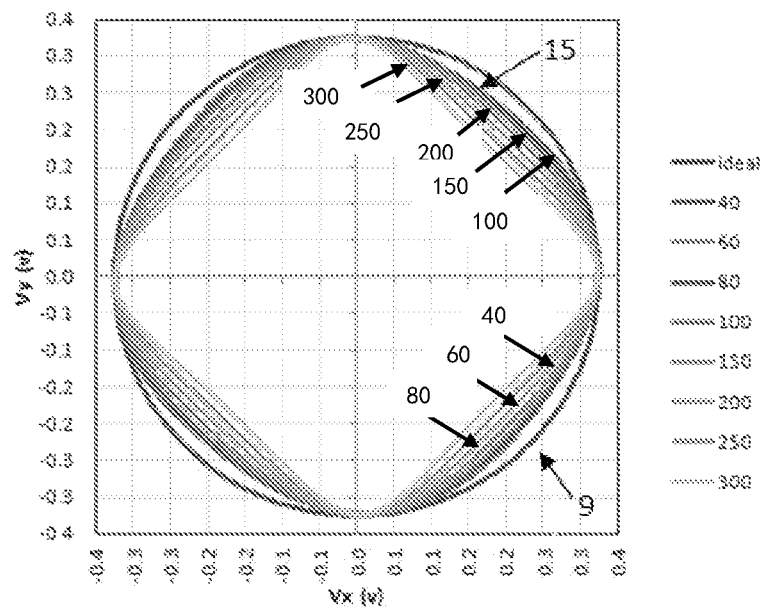
FIG. 13A is an XY-curve obtained by plotting of the non-calibrated X-axis output vs. the Y-axis output in several external magnetic fields having different intensity.
Figure 13B:
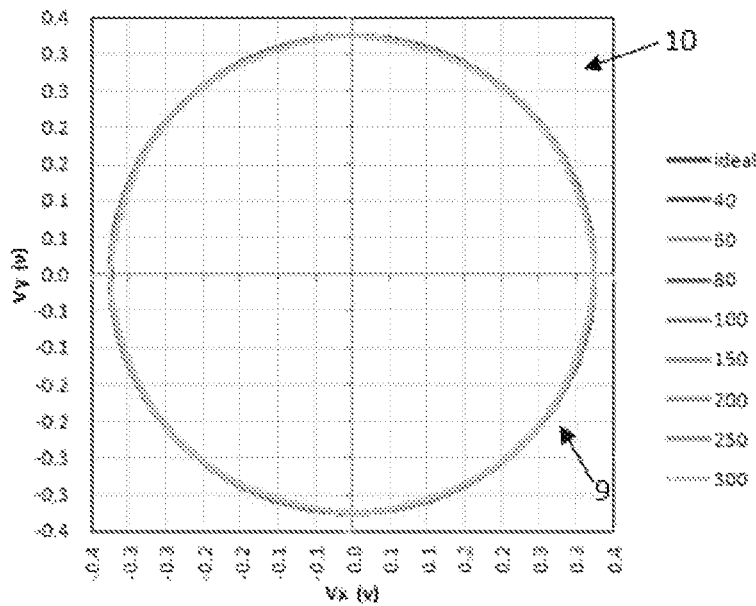
FIG. 13B is an XY-curve obtained by plotting of the corrected X-axis output vs. the Y-axis output in several external magnetic fields having different intensity, indicating that the output error can be corrected.
Figure 13C:
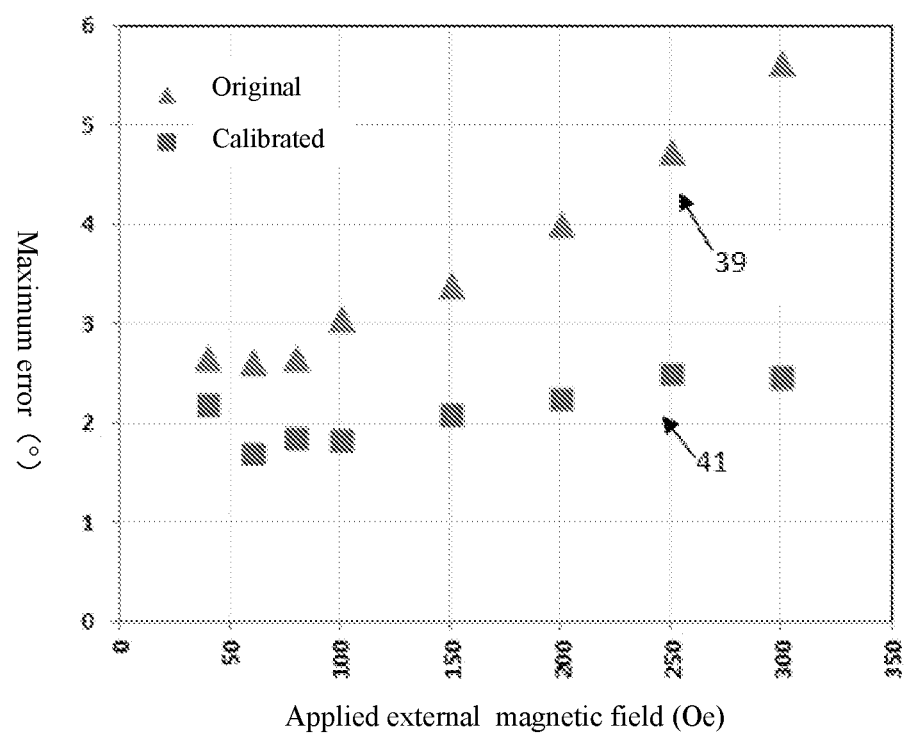
FIG. 13C shows that the angle error after calibration is much less than the original error.

FIG. 13A is a group of non-ideal XY-curves 15 obtained by plotting of the non-calibrated X-axis output vs. the Y-axis output and an ideal XY-curve 9 obtained by plotting of the ideal X-axis output vs. the Y-axis output. FIG. 13B and FIG. 13C show effects after modification is made by using the formulas (18) and (19). FIG. 13B indicates that the calibrated XY-curve 10 obtained by plotting of the calibrated X-axis voltage output vs. the Y-axis voltage output is an ideal circle, identical to the circle of the ideal output XY-curve 9. FIG. 13C shows that the angle error 41 after correction is much less than the original error 39, and the algorithm correction seems to reduce the correlation between the non-linear angle error and the intensity of the external magnetic field.

When this algorithm is used, it should be noted that if the peak value and the offset varies with the temperature, in this case, temperature related calibration needs to be conducted. Generally, the calibration may be conducted through the following assumptions:

$$V_{os} = V_{os}(T) = V_{os}(T1) - aT \quad (26)$$

$$V_{oc} = V_{oc}(T) = V_{oc}(T1) - aT \quad (27)$$

$$V_{os} = V_{os}(T) = V_{os}(T1) - \beta T \quad (28)$$

$$V_{oc} = V_{oc}(T) = V_{oc}(T1) - \beta T \quad (29)$$

Here, $\alpha$ and $\beta$ are known temperature coefficients of the sensor 1, T1 is the temperature of the MR angle sensor 1 when being calibrated, and T is an operating temperature measured by using an on-chip thermometer. These temperature correction coefficients may be used in the formulas (7) and (8) to compensate the error caused by the temperature in the algorithm of the present invention.

Figure 14:
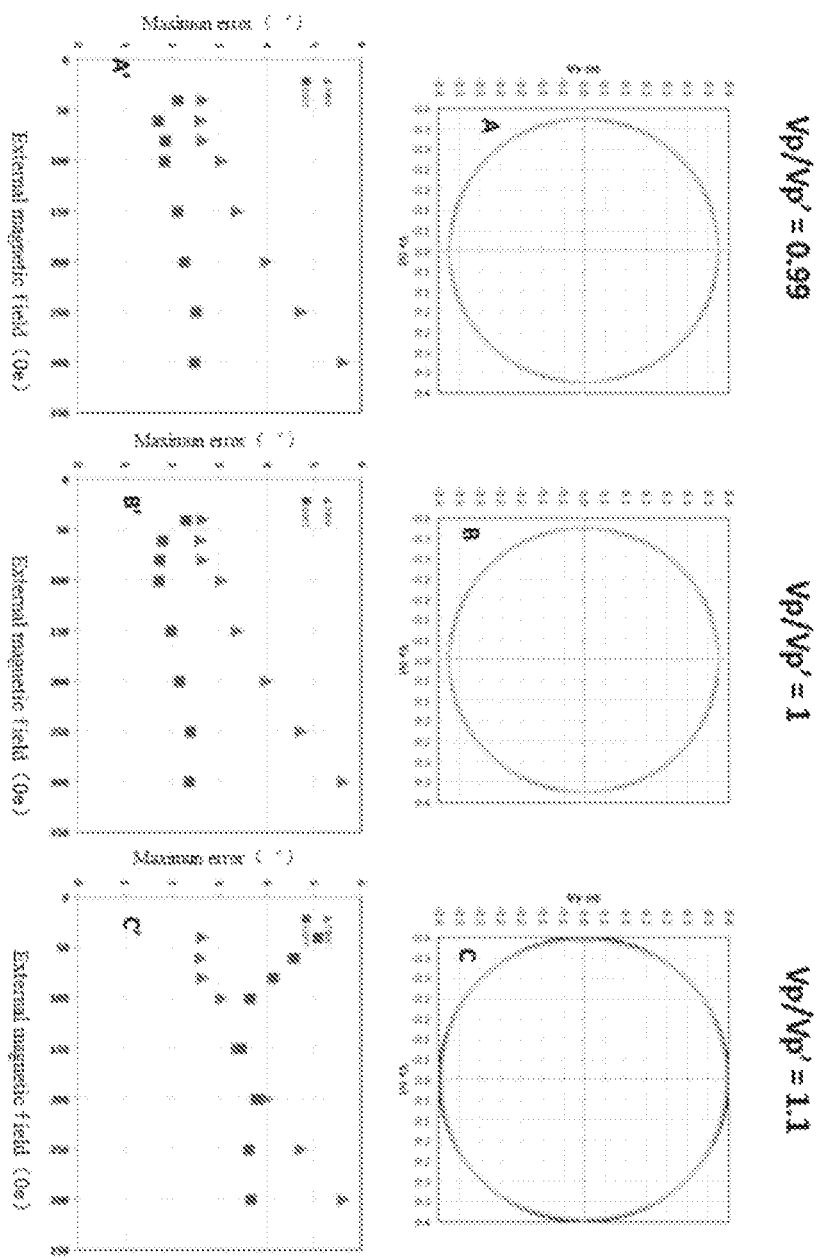
FIG. 14 shows that the algorithm is still effective when the output change exceeds 10%, indicating that the correction algorithm is insensitive to temperature changes.

In an alternative method, if the peak value and the offset compensation value do not vary greatly with the temperature, the algorithm does not need temperature compensation. FIG. 14A to FIG. 14C' indicate that the error correction method of the present invention is effective within an output error change of 10%: VP/Vp'=0.99, 1, and 1.1. FIG. 14A' to FIG. 14C' indicate that the original maximum error increases as the external magnetic field is enhanced. In addition to being in a range of 0-150 Oe and VP/Vp'=1.1, the modified maximum error is less than the original maximum error. FIG. 14A to FIG. 14C indicate that an XY-curve obtained by plotting of the modified X-axis output vs. the Y-axis output is a circle.

Figure 15A:
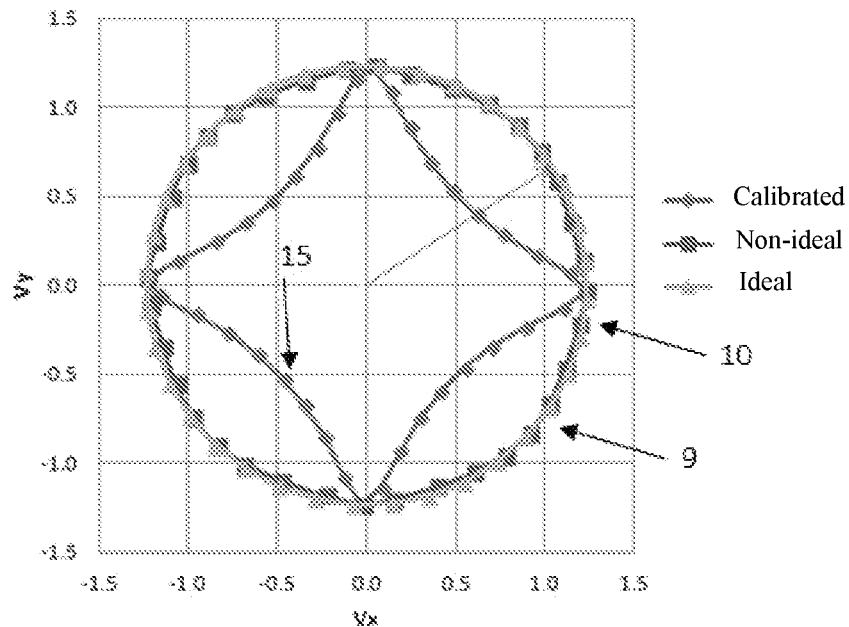
FIG. 15A to FIG. 15C indicate that this algorithm can reduce the error by 3 times when used for calibrating a highly distorted output.
Figure 15B:
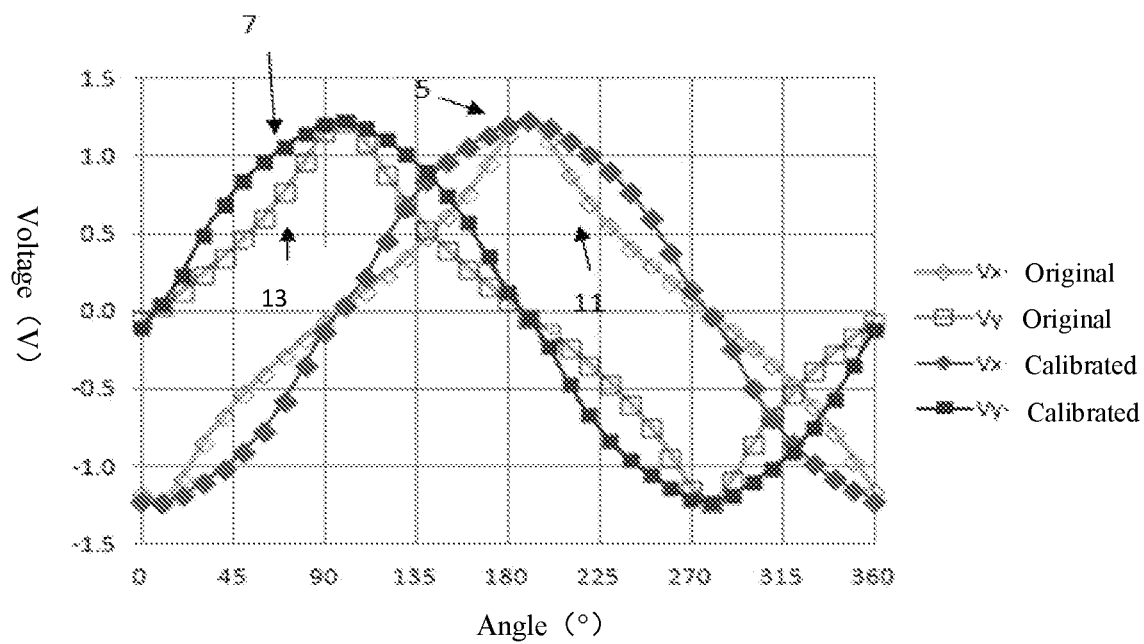
Figure 15C:
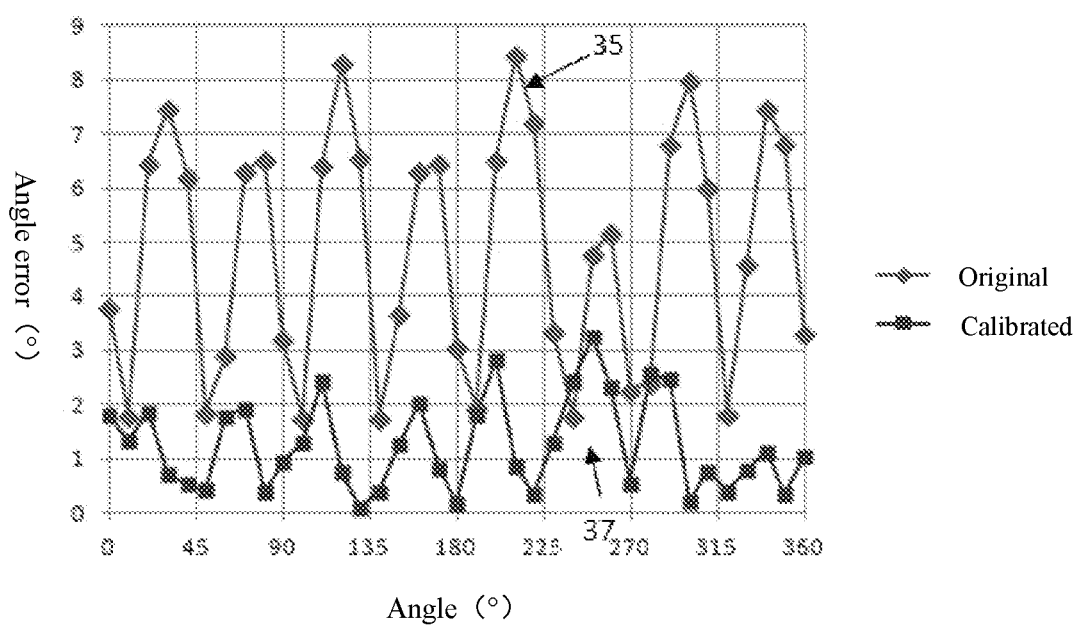

FIG. 15A, FIG. 15B and FIG. 15C indicate that the reduction of the output error exceeds 3 times. The algorithm is applied to a highly distorted output curve. FIG. 15A is a calibrated XY-curve 10 obtained by plotting of the non-ideal XY-curve 15, the ideal XY-curve 9 and the corrected X-axis output vs. the Y-axis output. Upon real-time correction, the curves 11 and 13 of triangular waveforms become ideal cosine or sine waveform 5 and 7 in FIG. 15B. FIG. 15C indicates that the corrected angle error is less than the original error by 3 times. A curve 35 is the error before calibration, and a curve 37 is the error after calibration.

Figure 16:
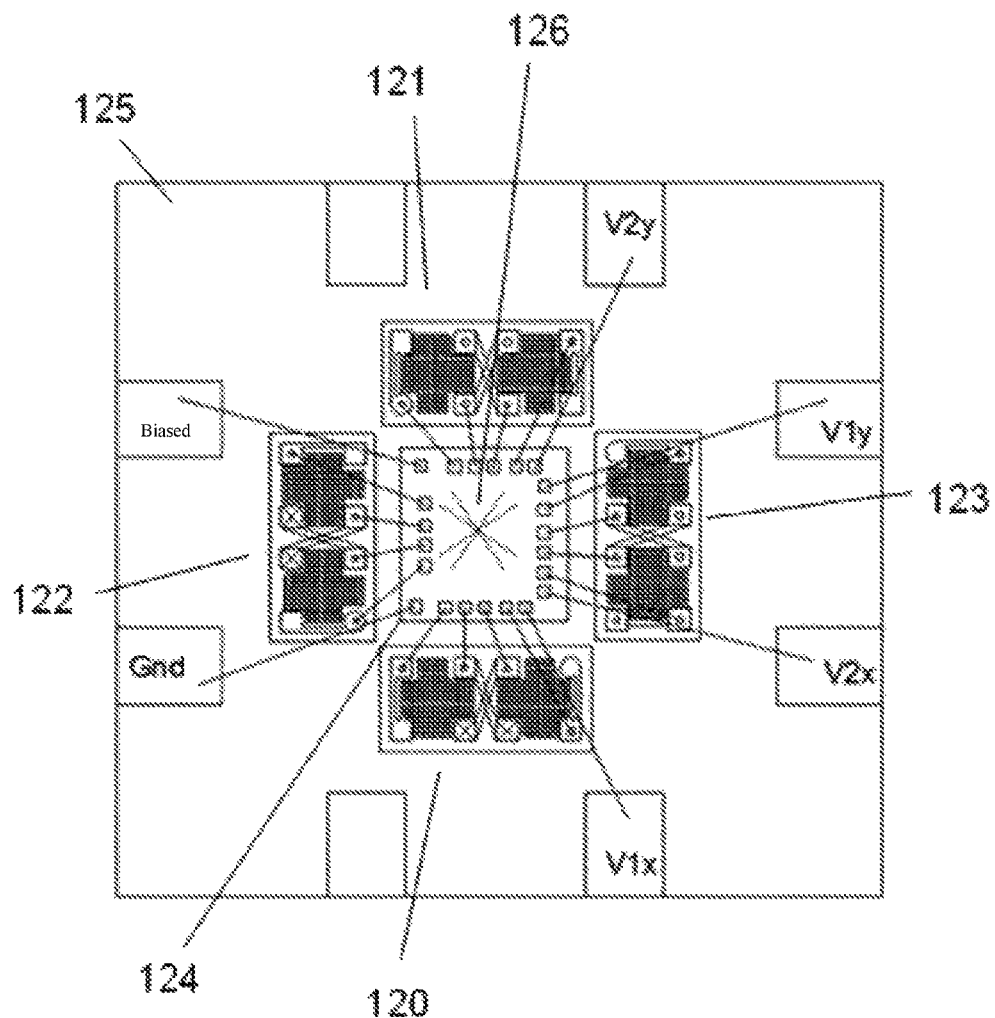
FIG. 16 is a design of a biaxial magnetoresistive angle sensor.

FIG. 16 is a possible arrangement of four sensor chips 120, 121, 122, and 123 to make a biaxial magnetic field angle sensor 1 for detecting sine and cosine components of a rotating magnetic field. The four sensors are arranged on a circumference surrounding a central ASIC124, and are electrically connected to each other by using a standard wire welding technology. The arrangement of the four chips enables the orthogonal full bridge to have a common center 126. The ASIC may contain an electrostatic discharge protection circuit, and it may also provide a circuit for converting a signal output angle of the orthogonal sensor into a digital format.

Figure 17:
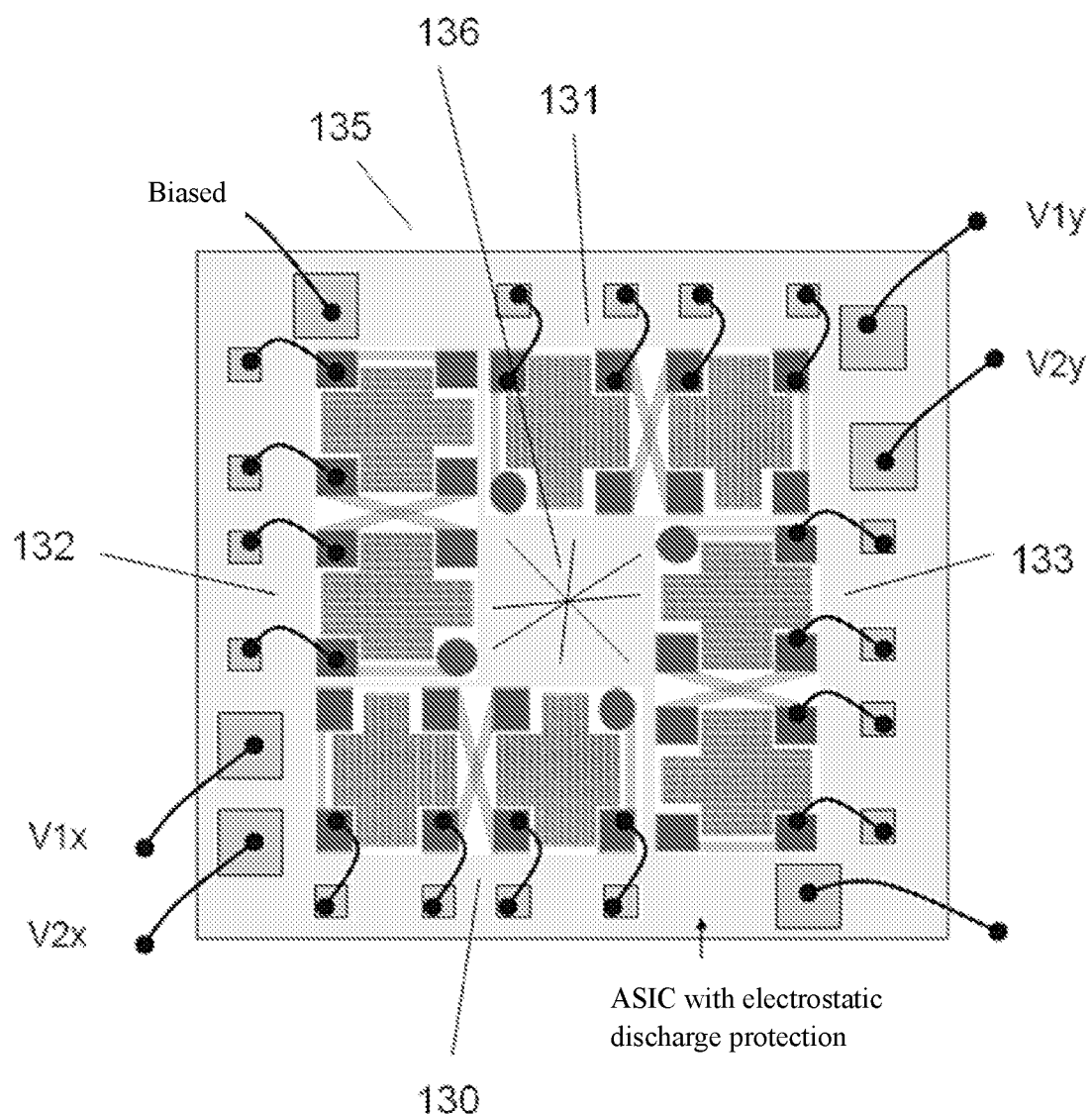
FIG. 17 is a design of another biaxial magnetoresistive angle sensor.

FIG. 17 shows another possible arrangement of four sensor chips 130, 131, 132, and 133 to make a biaxial magnetic field angle sensor 1 for detecting sine and cosine components of the rotating magnetic field. The four sensors are circularly symmetric to each other and are located on the top of an ASIC135. Different from the design in FIG. 16, the sensor chips are oblique such that the sensor 1 is closer to a common geometric center. The arrangement of the four chips enables the orthogonal full bridge to have a common center 136. The ASIC may contain an electrostatic discharge protection circuit, and it may also provide a circuit for converting a signal output angle of the orthogonal sensor into a digital format.

The biaxial magnetic field angle sensor 1 is deposited to or connected to an application specific integrated chip (ASIC) circuit or another apparatus to run the algorithm disclosed in the present invention. The design further includes internal or external data storage. Specifically, the ASIC includes an apparatus for calculating a difference between a known vector magnitude calibration value and a real-time biaxial vector magnitude according to the voltage outputs of the X-axis and the Y-axis of each single-axis magnetic field angle sensor, an apparatus for dividing the difference by the square root of 2 to calculate an error signal, and an apparatus for adding the error signal to or subtracting the error signal from the X and Y voltage outputs to generate an error-corrected X voltage output signal and an error-corrected Y voltage output signal, wherein an arc tangent of a factor of the error-corrected Y voltage output signal and the error-corrected X voltage output signal is a to-be-measured angle value of the applied external magnetic field.

The biaxial magnetic field angle sensor 1 may further include a temperature sensor, and a temperature signal from the temperature sensor is used for the known linearly expanded calibration and offset values with respect to the temperature.

The temperature sensor and the data storage may be included in the ASIC 124, or they may be located in the angle sensor chip or connected to the chip separated from the ASIC 124.

The above descriptions are merely preferred embodiments of the present invention, and are not intended to limit the present invention. For those skilled in the art, the present invention may have various modifications and changes, and the implementations in the present invention may also have different combinations and changes. Any modification, equivalent replacement, improvement and the like without departing from the spirit and principle of the present invention should all fall within the protection scope of the present invention.

The invention claimed is:

1. A biaxial magnetoresistive angle sensor for detecting a rotation angle of an external magnetic field, comprising:
   two orthogonal single-axis magnetoresistive angle sensors for detecting the external magnetic field in an X-axis direction and a Y-axis direction that are perpendicular to each other,
   a unit for calculating a measured vector magnitude of the outputs of the single-axis magnetoresistive angle sensors along the X-axis and the Y-axis in real time,
   a unit for calculating a difference between a known calibration vector magnitude and the measured vector magnitude,
   a unit for dividing the difference by the square root of 2 in order to calculate an error signal,
   a unit for adding the error signal to the X-axis output and the Y-axis output respectively or subtracting the error signal from the X-axis output and the Y-axis output in order to calculate the calibrated output signals of the X-axis and the Y-axis angle sensors, and
   a unit for calculating an arc tangent of a factor obtained by dividing the calibrated Y-axis output signal by the calibrated X-axis output signal to provide the rotation angle of the external magnetic field.

2. The biaxial magnetoresistive angle sensor according to claim 1, wherein the X-axis output and the Y-axis output are respectively an offset-calibrated X-axis voltage output and an offset-calibrated Y-axis voltage output, a first offset calibration value is subtracted from the X-axis voltage output to obtain the offset-calibrated X-axis voltage output; and a second offset calibration value is subtracted from the Y-axis voltage output to obtain the offset-calibrated Y-axis voltage output.

3. The biaxial magnetoresistive angle sensor according to claim 2, wherein the first offset calibration value is $Vox=\{Max[V_{cos}(\theta,H)]+Min[V_{cos}(\theta,H)]\}/2$, and the second offset calibration value is $Voy=\{Max[V_{sin}(\theta,H)]+Min[V_{sin}(\theta,H)]\}/2$.

4. The biaxial magnetoresistive angle sensor according to claim 1, wherein each of the single-axis magnetoresistive angle sensors is a GMR spin valve or a TMR sensor.

5. The biaxial magnetoresistive angle sensor according to claim 1, comprising a temperature sensor.

6. The biaxial magnetoresistive angle sensor according to claim 1, wherein the voltage outputs of the X-axis single-axis magnetoresistive sensor and the Y-axis single-axis magnetoresistive sensor that are orthogonal to each other have approximately identical maximum amplitudes.

7. The biaxial magnetoresistive angle sensor according to claim 1, wherein the known calibration vector magnitude is $$V_p=\{Max[Vx(\theta,H)]-Min[Vx(\theta,H)]+Max[Vy(\theta,H)]-Min[Vy(\theta,H)]\}/4.$$

8. The biaxial magnetoresistive angle sensor according to claim 1, comprising a unit for storing the offset value and a calibration constant of the maximum amplitude, the calibration constant of the maximum amplitude being calculated by using the maximum peak value and the minimum peak value obtained when each single-axis magnetoresistive angle sensor rotates by 360 degrees in the external magnetic field, and the biaxial magnetoresistive angle sensor only needing to store the peak value and the offset value for calibration of each of the single-axis magnetoresistive sensor.

9. A biaxial magnetoresistive angle sensor, comprising:
   two orthogonal single-axis magnetoresistive angle sensors for detecting an external magnetic field in an X-axis direction and a Y-axis direction that are perpendicular to each other,
   a unit for calculating a measured vector magnitude of the outputs of the single-axis magnetoresistive angle sensor along the X-axis and the Y-axis in real time,
   a unit for calculating a difference between a known calibration vector magnitude and the measured vector magnitude,
   a unit for dividing the difference by the square root of 2 in order to calculate an error signal,
   a unit for adding the error signal to the X-axis output and the Y-axis output respectively or subtracting the error signal from the X-axis output and the Y-axis output in order to calculate the calibrated output signals of the X-axis and the Y-axis angle sensors,
   a unit for calculating an arc tangent of a factor obtained by dividing the calibrated Y-axis output signal by the calibrated X-axis output signal to provide a rotation angle of the external magnetic field, and
   a temperature sensor, wherein a temperature signal generated by the temperature sensor is used for calculating a linearly varying peak value, the offset calibration value, and/or vector magnitude calibration value with respect to temperature.

10. A method for calibrating error correction of a magnetoresistive angle sensor that is configured for detecting a rotation angle of an external magnetic field, comprising:
    detecting the external magnetic field in an X-axis direction and a Y-axis direction that are perpendicular to each other by using two orthogonal single-axis magnetoresistive angle sensors;

calculating a measured vector magnitude of the voltage outputs of the single-axis magnetoresistive angle sensors along the X-axis and the Y-axis in real time;

calculating a difference between a known calibration vector magnitude and the measured vector magnitude;

dividing the difference by the square root of 2 in order to calculate an error signal;

adding the error signal to the X-axis output and the Y-axis output respectively or subtracting the error signal from the X-axis output and the Y-axis output in order to calculate the calibrated output signals of the X-axis and the Y-axis angle sensors; and calculating an arc tangent of a factor obtained by dividing the calibrated Y-axis output signal by the calibrated X-axis output signal to provide the rotation angle of the external magnetic field.

11. The method according to claim 10, wherein the X-axis output and the Y-axis output are respectively an offset-calibrated X-axis voltage output and an offset-calibrated Y-axis voltage output, a first offset calibration value is subtracted from the X-axis voltage output to obtain the offset-calibrated X-axis voltage output; and a second offset calibration value is subtracted from the Y-axis voltage output to obtain the offset-calibrated Y-axis voltage output.

12. The method according to claim 11, wherein the first offset calibration value is $Vox=\{Max[V_{cos}(\theta,H)]+Min[V_{cos}(\theta,H)]\}/2$, and the second offset calibration value is $Voy=\{Max[V_{sin}(\theta,H)]+Min[V_{sin}(\theta,H)]\}/2$.

13. The method according to claim 10, wherein the voltage outputs of the X-axis single-axis magnetoresistive sensor and the Y-axis single-axis magnetoresistive sensor that are orthogonal to each other have approximately identical maximum amplitudes.

14. The method according to claim 10, wherein the known calibration vector magnitude is $$V_p=\{Max[Vx(\theta,H)]-Min[Vx(\theta,H)]+Max[Vy(\theta,H)]-Min[Vy(\theta,H)]\}/4.$$

15. The method according to claim 10, wherein the offset value and a calibration constant of the maximum amplitude are stored; the calibration constant of the maximum amplitude is calculated by using the maximum peak value and the minimum peak value obtained when each single-axis magnetoresistive angle sensor rotates by 360 degrees in the external magnetic field, and the magnetoresistive angle sensor only needs to store the peak value and the offset value for calibration of each of the single-axis magnetoresistive sensor.

16. A calibration method for magnetic field measurement error correction of a magnetoresistive angle sensor, comprising:

detecting an external magnetic field in an X-axis direction and a Y-axis direction that are perpendicular to each other by using two orthogonal single-axis magnetoresistive angle sensors;

calculating a measured vector magnitude of the voltage outputs of the magnetoresistive angle sensor along the X-axis and the Y-axis in real time;

calculating a difference between a known calibration vector magnitude and the measured vector magnitude;

dividing the difference by the square root of 2 in order to calculate an error signal;

adding the error signal to the X-axis output and the Y-axis output respectively or subtracting the error signal from the X-axis output and the Y-axis output in order to calculate the calibrated output signals of the X-axis and the Y-axis angle sensors; and calculating an arc tangent of a factor obtained by dividing the calibrated Y-axis output signal by the calibrated X-axis output signal to provide a rotation angle of the external magnetic field, wherein a peak value, the offset calibration value and/or vector magnitude calibration value are expanded linearly with respect to temperature.

* * * * *